US006778983B1

(12) United States Patent
Bates et al.

(10) Patent No.: US 6,778,983 B1
(45) Date of Patent: Aug. 17, 2004

(54) APPARATUS AND METHOD FOR ACCESSING HTML FILES USING AN SQL QUERY

(75) Inventors: Cary Lee Bates, Rochester, MN (US); Paul Reuben Day, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/561,000

(22) Filed: Apr. 28, 2000

(51) Int. Cl.[7] .............................................. G06F 17/30
(52) U.S. Cl. ................................ 707/4; 707/5; 707/10; 707/102; 715/513
(58) Field of Search ............................ 707/4, 10, 102, 707/3, 5; 715/513

(56) References Cited

U.S. PATENT DOCUMENTS

| | | | |
|---|---|---|---|
| 5,623,652 A | 4/1997 | Vora et al. | |
| 5,737,739 A | 4/1998 | Shirley et al. | |
| 5,761,656 A | * 6/1998 | Ben-Shachar | ................... 707/4 |
| 5,778,400 A | 7/1998 | Tateno | |
| 5,826,258 A | * 10/1998 | Gupta et al. | .................... 707/4 |
| 5,864,843 A | 1/1999 | Carino, Jr. et al. | |
| 5,870,739 A | 2/1999 | Davis, III et al. | |
| 5,875,441 A | 2/1999 | Nakatsuyama | |
| 5,913,214 A | * 6/1999 | Madnick et al. | ............... 707/10 |
| 5,940,842 A | 8/1999 | Sakuta | |
| 6,185,608 B1 | * 2/2001 | Hon et al. | ..................... 707/10 |
| 6,247,018 B1 | * 6/2001 | Rheaume | ..................... 707/102 |
| 6,263,332 B1 | 7/2001 | Nasr et al. | |
| 6,285,998 B1 | * 9/2001 | Black et al. | ................. 345/810 |
| 6,356,889 B1 | * 3/2002 | Lohman et al. | ............... 707/10 |
| 6,424,980 B1 | 7/2002 | Iizuka et al. | |
| 6,529,910 B1 | * 3/2003 | Fleskes | ......................... 707/10 |
| 6,601,071 B1 | * 7/2003 | Bowker et al. | .............. 707/102 |
| 6,721,727 B2 | * 4/2004 | Chau et al. | ..................... 707/3 |
| 2002/0116371 A1 | * 8/2002 | Dodds et al. | ................... 707/3 |

OTHER PUBLICATIONS

A. Mendelzon et al., "Querying the World Wide Web", IEEE 1996, 0–8186–7475–X/96, pp. 80–91.*
D. Konopnicki et al., "W3QS—A System for WWW Querying," IEEE 1997, 1063–6382/97, p. 586.
A. Mendelzon et al., "Querying the World Wide Web," IEEE 1996, 0–8186–745–X/96, pp. 80–91.

(List continued on next page.)

*Primary Examiner*—Shahid Alam
*Assistant Examiner*—Chongshan Chen
(74) *Attorney, Agent, or Firm*—Martin & Associates, LLC; Derek P. Martin (57) ABSTRACT

An apparatus and method allow accessing data in an HTML file (such as a JSP or ASP file) via an SQL query. A database table is created for each HTML file, and a record is created in each database table that corresponds to each HTML element in the corresponding HTML file. A cross-reference is then created that correlates the HTML file to its corresponding database table. An SQL engine in accordance with the preferred embodiments then processes an SQL query that specifies an HTML file and one or more elements in the HTML file by using the cross-reference information to formulate a new SQL query that accesses the corresponding database table rather than the specified HTML file. When a database table is updated by an SQL query, the corresponding HTML file is re-generated from the data in the database table. In this manner the SQL engine generates a query that accesses a database table from the original query that accesses the corresponding HTML file. The preferred embodiments thus disclose apparatus and methods for accessing HTML files using SQL. In this manner, the present invention provides all the power and flexibility of SQL when accessing data in an HTML file.

21 Claims, 9 Drawing Sheets

OTHER PUBLICATIONS

A. Mendelzon et al., "Querying the World Wide Web," IEEE 1996, 0-8186-7475-x/96, pp. 80-91.

R. Elmasri et al., "Fundamentals of Database Systems," 1994, Addison-Wesley Publishing Company, pp. 153-154.

"ODBC Error Messages," SQL Access Group SQL CAE specification (online), 1992 (retrieved Dec. 18, 2002), retrieved from: http://msdn.microsoft.com/library/en-us/tr-blsql/tr_err_odbc_5stz.asp?frame=true.

* cited by examiner

FIG. 1

SQL Query

210 — Select        col. A, col. B
220 — from          File1
230 — where       col. A < 4

FIG. 2     Prior Art

Database Table

| Col. A | Col. B | Col. C |
|---|---|---|
| 3 | "1" | 0 |
| 6 | "12" | 0 |
| 9 | "The" | 3 |
| 15 | "258" | 2 |
| 7 | "3" | 0 |
| 12 | "car" | 6 |
| 2 | "green" | 4 |

FIG. 3     Prior Art

SQL Query Results

3    "1"
2    "green"

Cross-Reference List

| HTML File Name | DB Table Name |
|---|---|
| Help1.jsp | Help1.dbf |
| Go.asp | Go.dbf |

Example.jsp
```
<html>
<head></head>

<body>
<!--Display the header -->
<table>
<!--Show the following information-->
<tr>
        <INPUT TYPE="HIDDEN" NAME="SELECTINDEX" VALUE="WEBINDEX">
        <INPUT NAME="FULLNAME" VALUE="John Doe">
        <INPUT NAME="AGE"    VALUE="25">
        <INPUT NAME="EMPLOYER" VALUE="IBM">
        <INPUT NAME="TYPE" VALUE="F">
</tr>
</table>
<a href="Example.jsp">Example </a>
</body>
```

FIG. 11

Example.dbf

| DB Table Name | Column Name | Value | Type | Associated Information | |
|---|---|---|---|---|---|
| Example.dbf | | | | HTML data | — 1210 |
| Example.dbf | SelectIndex | WebIndex | Text | Hidden | — 1220 |
| Example.dbf | Full Name | John Doe | Text | | — 1230 |
| Example.dbf | Age | 25 | Integer | | — 1240 |
| Example.dbf | Employer | IBM | Text | | — 1250 |
| Example.dbf | Type | F | Text | | — 1260 |
| Example.dbf | | | | HTML data | — 1270 |

```
update      Example.jsp
set         FULLNAME=John Dough,
            AGE=26
where       TYPE="F"
```

FIG. 13

```
update      Example.dbf
set         FULLNAME=John Dough,
            AGE=26
where       TYPE="F"
```

FIG. 14

Example.dbf

| DB Table Name | Column Name | Value | Type | Associated Information | |
|---|---|---|---|---|---|
| Example.dbf | | | | HTML data | — 1210 |
| Example.dbf | SelectIndex | WebIndex | Text | Hidden | — 1220 |
| Example.dbf | Full Name | John Dough | Text | | — 1230 |
| Example.dbf | Age | 26 | Integer | | — 1240 |
| Example.dbf | Employer | IBM | Text | | — 1250 |
| Example.dbf | Type | F | Text | | — 1260 |
| Example.dbf | | | | HTML data | — 1270 |

FIG. 15

```
                        Example.jsp
<html>
<head></head>

<body>
<!--Display the header -->
<table>
<!--Show the following information-->
<tr>
        <INPUT TYPE="HIDDEN" NAME="SELECTINDEX" VALUE="WEBINDEX">
        <INPUT NAME="FULLNAME" VALUE="John Dough">     ◄──── 1610
        <INPUT NAME="AGE"      VALUE="26">             ◄──── 1620
        <INPUT NAME="EMPLOYER" VALUE="IBM">
        <INPUT NAME="TYPE" VALUE="F">
</tr>
</table>
<a href="Example.jsp">Example </a>
</body>
```

FIG. 16

APPARATUS AND METHOD FOR ACCESSING HTML FILES USING AN SQL QUERY

RELATED APPLICATION

This application is related to "Apparatus and Method for Accessing Html Elements Using an SQL Query", Ser. No. 09/541,198, filed on Apr. 3, 2000, which is incorporated herein by reference.

BACKGROUND OF THE INVENTION

1. Technical Field

This invention generally relates to computer systems and more specifically relates to an apparatus and method for accessing information stored in a computer system.

2. Background Art

Since the dawn of the computer era, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

Many modern computer systems are a complex combination of different hardware and software that are interconnected on a network. One network that has gained in importance and popularity in recent years is the Internet. A user typically accesses information on the Internet using a web browser that receives information in Hypertext Markup Language (HTML). HTML is typically organized into "pages" of information, with various "elements" making up components on each page. When a user-accesses a web page using a browser, a server computer system locates the HTML elements that make up the page and serves up the page to the requesting web browser.

Recent developments have improved the manner for web servers to render web pages. In the past, web pages were rendered by a hybrid mixture of code and HTML elements. However, progress has been made in segregating the code that renders a web page from the HTML elements that make up the web page. For example, Sun Microsystems has developed a Java construct known as a JavaServer Page (JSP). All of the HTML elements on a page are written to a JSP file, which can then be read by code that needs to render the web page. The result is a separation between the code that renders the page and the HTML elements that make up the page, thereby allowing web page designers to design web pages without concern for the code that renders the page, and allowing programmers to render a web page by simply processing a JSP in a predefined manner. In this manner the code that renders a web page is separate from the creative HTML elements that make up the page. Microsoft Corporation has also come up with a similar way to separate code from HTML elements known as ActiveServer Page (ASP). Both JSP and ASP files are examples of "HTML files".

The Related Application referenced above discloses a way to access HTML elements in an HTML web page using a structured query language (SQL) query. This is useful on the browser, where browsers read HTML pages. However, there is currently no known mechanism or method for using SQL on the server side to access elements in an HTML file, such as a JSP or ASP. Without an apparatus and method for accessing data in an HTML file using SQL, the computer industry will continue to suffer from inefficient ways of accessing HTML files.

DISCLOSURE OF INVENTION

According to the preferred embodiments, an apparatus and method allow accessing data in an HTML file (such as a JSP or ASP file) via an SQL query. A database table is created for each HTML file, and a record is created in each database table that corresponds to each HTML element in the corresponding HTML file. A cross-reference is then created that correlates the HTML file to its corresponding database table. An SQL engine in accordance with the preferred embodiments then processes an SQL query that specifies an HTML file and one or more elements in the HTML file by using the cross-reference information to formulate a new SQL query that accesses the corresponding database table rather than the specified HTML file. When a database table is updated by an SQL query, the corresponding HTML file is re-generated from the data in the database table. In this manner the SQL engine generates a query that accesses a database table from the original query that uses the corresponding HTML file. The preferred embodiments thus disclose apparatus and methods for accessing HTML files using SQL. In this manner, the present invention provides all the power and flexibility of SQL when accessing data in an HTML file.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Overview

The present invention relates to accessing information using Structured Query Language (SQL). For those that are not familiar with SQL, a sample query is provided below as background material that will help the reader to understand the concepts of the present invention.

Figure 3:
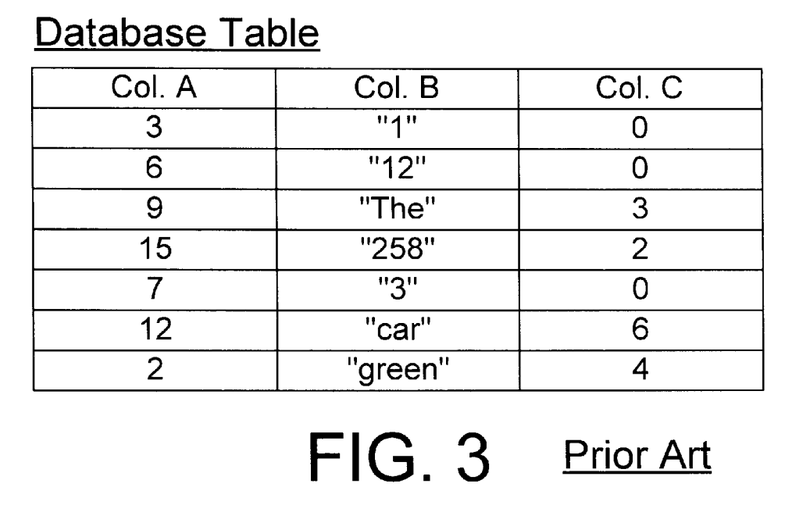
FIG. 3 is a block diagram of a sample prior art database table that has three columns.

Relational databases in use today typically store data in tables that have rows and columns. Each row in the table defines an entry, or "record" in the database, while each column defines a "field" within the record that holds data according to the specified data type of the field. In other words, text fields hold text data, numeric fields hold numeric data, etc. A sample database table is shown in FIG. 3. We assume that column A contains numeric data, column B contains text data, and column C contains numeric data.

Various methods and mechanisms have been developed to access information stored in databases. One popular way to access database information is Structured Query Language (SQL). SQL is a very popular query language that allows the retrieval and manipulation of data stored in a database. For general information relating to SQL, see DB2 Universal Database for AS/400 SQL Programming Guide, part number SC41-5611, and DB2 Universal Database for AS/400 SQL Reference Guide, part number SC41-5612, which are published and available from IBM Corporation. One of the principal advantages of SQL is that many tools are provided within SQL for the manipulation of data once it is retrieved. Another great advantage of SQL is that it can be written so that it is platform-independent, so queries written on one platform may be easily ported to other platforms.

Figure 2:
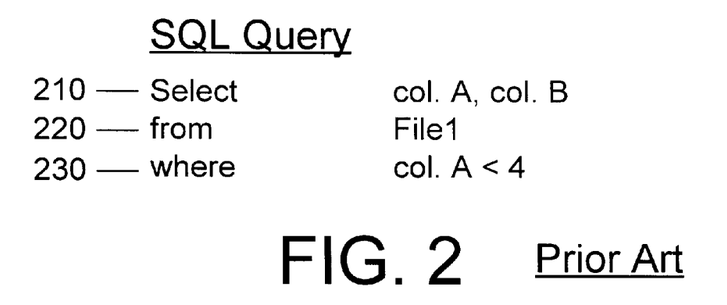
FIG. 2 is a diagram of a sample prior art query in Structure Query Language (SQL)

Referring now to FIG. 2, a sample query in Structured Query Language (SQL) is shown. The "select" statement 210 in SQL is a statement that retrieves data from the database. The allowable arguments in a prior art SQL "select" statement are columns in the database. Thus, the select statement 210 in FIG. 2 specifies retrieving data from both columns A and B. The "from" portion 220 of the select statement specifies a file from which the data is to be retrieved. The "where" portion 230 of the "select" statement allows specifying a criteria that the retrieved data must meet in order to be returned. The SQL query in FIG. 2 will thus return all values in columns A and B in File1 where the numeric value in column A is less than four.

Figure 4:
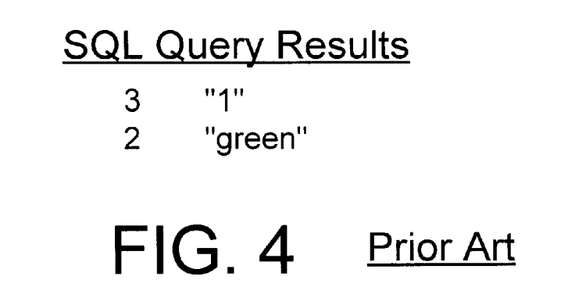
FIG. 4 is a diagram showing the results of the SQL query in FIG. 2 when applied to the database table in FIG. 3.

We now assume for this example that the database table in FIG. 3 is named File 1. Applying the query in FIG. 2 to the database table in FIG. 3, we determine that the results of the query are as shown in FIG. 4. Only two records in the table satisfy the "where" criteria in the query, that the value in column A is less than four: the first record, which has a value in column A of 3, and the last record, which has a value in column A of 2. Thus, the query results are the values of columns A and B for these two records, as shown in FIG. 4.

SQL is a powerful tool for accessing and manipulating data stored in databases. However, prior art SQL engines do not recognize HTML files and HTML elements within those files. Attempting to access an HTML file using prior art SQL would result in an error, because the HTML file is not a database table. With the rapidly advancing use of HTML files on web servers, it would be very beneficial for programmers to be able to use an SQL-type query to access data stored in HTML files.

DETAILED DESCRIPTION

The present invention relates to accessing HTML elements in HTML files via SQL queries. First, a database table is generated for each HTML file, with a column in the database table corresponding to each HTML element in the HTML file. Next, a cross-reference is constructed that correlates each HTML file to its corresponding database table. An SQL engine processes a statement that accesses an HTML file by first accessing the cross-reference information for the specified HTML file, and substituting the appropriate database table name and columns for the corresponding HTML file and HTML elements in the query. The result is an SQL query that specifies columns in a database table, and can therefore be processed according to known techniques. When a database table is updated, its corresponding cross-reference is accessed, and the corresponding HTML file is then rebuilt from the updated information in the database table. In this manner a user may access HTML elements in HTML files using SQL queries.

Figure 1:
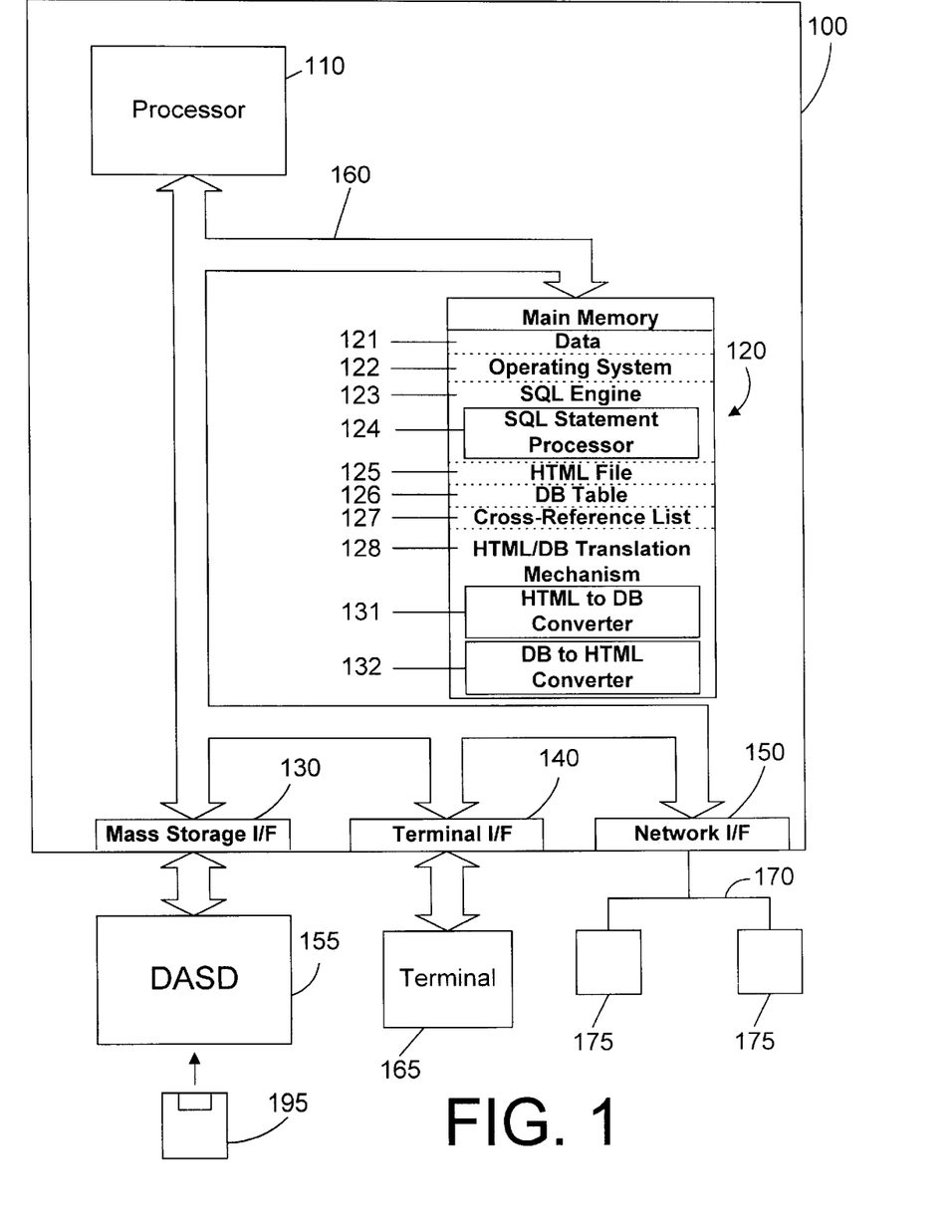
FIG. 1 is a block diagram of an apparatus in accordance with the preferred embodiments of the present invention.

Referring to FIG. 1, a computer system 100 in accordance with the preferred embodiment is an enhanced IBM AS/400 computer system. However, those skilled in the art will appreciate that the mechanisms and apparatus of the present invention apply equally to any computer system, regardless of whether the computer system is a complicated multi-user computing apparatus or a single user workstation. As shown in FIG. 1, computer system 100 comprises a processor 110 connected to a main memory 120, a mass storage interface 130, a display interface 140, and a network interface 150. These system components are interconnected through the use of a system bus 160. Mass storage interface 130 is used to connect mass storage devices (such as a direct access storage device 155) to computer system 100. One specific type of direct access storage device is a floppy disk drive, which may store data to and read data from a floppy diskette 195.

Main memory 120 in accordance with the preferred embodiments contains data 121, an operating system 122, an SQL engine 123, one or more HTML files 125, one or more corresponding database tables 126, a cross-reference list 127, and an HTML/DB translation mechanism 128. Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, SQL engine 123, HTML file 125, database table 126, cross-reference list 127, and HTML/DB translation mechanism 128 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Data 121 represents any data that serves as input to or output from any program in computer system 100. Operating system 122 is a multitasking operating system known in the industry as OS/400; however, those skilled in the art will appreciate that the spirit and scope of the present invention is not limited to any one operating system.

SQL engine 123 is a computer program that processes queries that-are formatted in Structured Query Language. The Structured Query Language in accordance with the preferred embodiments is expanded compared to prior art SQL in order to access data in HTML files. SQL engine 123 suitably includes an HTML statement processor 124. In the preferred embodiments, SQL statement processor 124 allows specifying an HTML file and one or more elements within the file. When the,SQL engine 123 processes a statement that has an HTML file and HTML elements as arguments, it passes control to the HTML statement processor 124, which re-formats the query to access data in a database table that corresponds to the HTML file. If either the HTML file or one of the specified HTML elements within the file do not exist, HTML statement processor 124 returns an error message to SQL engine 123, which indicates that the query could not be successfully processed.

HTML/DB translation mechanism 128 is a mechanism that translates data from HTML format to a database table format, and from database table format to HTML format. HTML/DB translation mechanism 128 includes an HTML to DB converter 131 that translates data in an HTML file to a corresponding database table. HTML to DB converter 131 is used to create a database table for each HTML file. HTML/DB translation mechanism further includes a DB to HTML converter 132 that translates data from a database table to a corresponding HTML file. DB to HTML converter 132 is used when an SQL query updates a database table, and that change needs to be reflected in the corresponding HTML file.

HTML file 125 represents any suitable HTML file format, such as JSP and ASP files. HTML file 125 preferably specifies one or more HTML elements. Before HTML files may be processed using SQL queries, the HTML to DB converter 131 in the HTML/DB translation mechanism 128 is used to generate a corresponding database table 126 for each HTML file 125 stored in memory. After a new database table 126 is created, HTML to DB converter 131 adds an entry-to the cross-reference list.,127 that correlates the HTML file to its corresponding database table. The SQL statement processor 124 uses the information in the cross-reference list 127 to determine which database table corresponds to an HTML file that is specified in a query. SQL statement processor 124 then determines from the corresponding database table which columns correspond to which HTML elements in the HTML file according to the order of columns in the database table. The SQL statement processor 124 substitutes the database file and columns for the corresponding HTML file and elements in the query to arrive at a query that can be processed by known SQL techniques. In this manner the SQL statement select processor 124 can be aware of HTML files and elements without changing the way a database query is processed by the SQL engine 123.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100. Note, however, that while terminal interface 140 is provided to support communication with one or more terminals 165, computer system 100 does not necessarily require a terminal 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol, and the Internet is an example of a suitable network 170.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include recordable type media such as floppy disks (e.g., 195 of FIG. 1) and CD ROM, and transmission type media such as digital and analog communications links.

Figure 5:
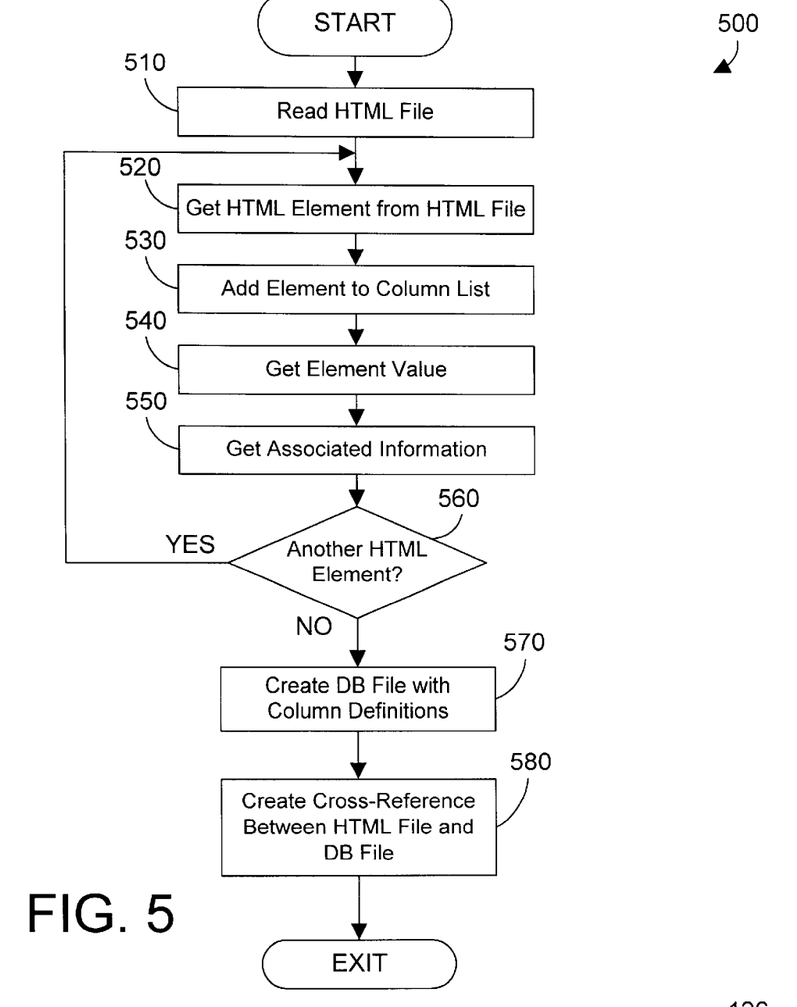
FIG. 5 is a flow diagram of a method for generating a database table from an HTML file in accordance with the preferred embodiments.

Referring now to FIG. 5, a method 500 represents steps performed by the HTML to DB converter 131 within the HTML/DB translation mechanism 128 in accordance with the preferred embodiments. The HTML file is read (step 510). One of the HTML elements within the HTML file is then selected (step 520). This element is added to a "column list" (step 530), which is a list of columns that will be created in a database table that corresponds to the selected HTML file. The value for the HTML element is then retrieved (step 540), as well as associated information for the HTML element (step 550). If there is another HTML element in the selected HTML file (step 560=YES), method 500 loops back to step 520 to process the next HTML element in the HTML file. When the element values and associated information for each HTML element has been retrieved (step 560=NO), a database table is then created (step 570) with the column definitions in the column list and with values and associated information that were read from the HTML file in step 540 and 550. The result is a database table (such as DB table 126 of FIGS. 1 and 6) that corresponds to the HTML file that was read in step 510. At this point a cross-reference between the HTML file and its corresponding database table is created (step 580), and method 500 exits. Note that method 500 is repeated for each HTML file, and the result of performing method 500 for each HTML file is that each HTML file will have a corresponding database table, and the correlation between HTML files and database tables will be indicated in the cross-reference list (127 of FIG. 1).

Figure 6:
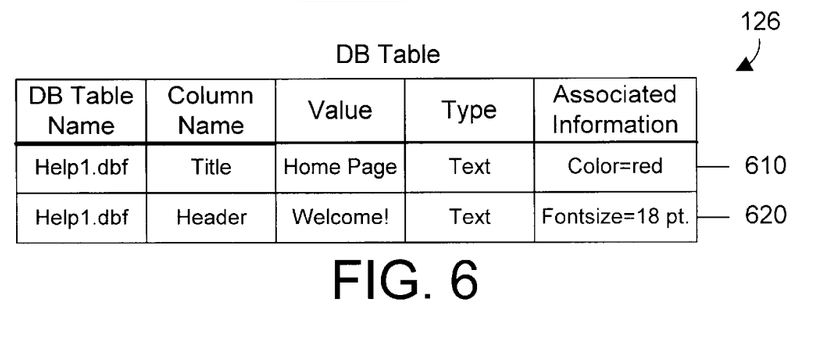
FIG. 6 is a block diagram of a sample database table in accordance with the preferred embodiments.

Referring now to FIG. 6, a sample database table 126 is shown that includes columns for each HTML element in an HTML file. For this example, we assume that the HTML file contains the following elements: title, header. The specific table of FIG. 6 includes two records 610 and 620. In addition to the column (COLUMN NAME) that corresponds to the name of the element, each record also includes the name of the database table (Help1.dbf), and a VALUE, TYPE, and ASSOCIATED INFORMATION. Note that the "associated information" is information that is needed by DB to HTML converter 132 to convert the value in a record into its corresponding HTML element. Font color (as shown in record 610) and font size (as shown in record 620) are examples of associated information. Of course, other information could be included within the associated information field of each record as well.

Figure 7:
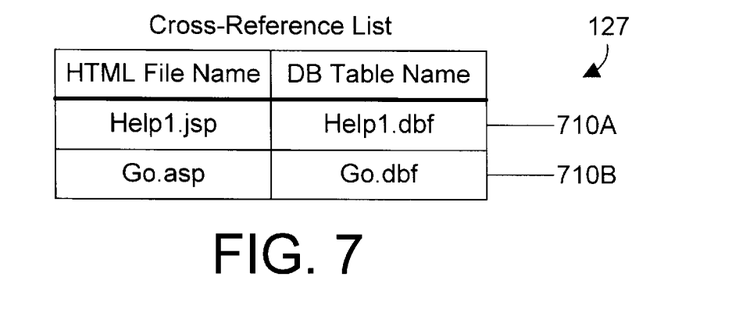
FIG. 7 is a block diagram of a cross-reference between HTML files and their corresponding database tables.

One specific implementation for the cross-reference list 127 of FIG. 1 is shown in FIG. 7. This list includes HTML file name/DB table name pairs that correlate an HTML file with its associated database table. For example, entry 710A indicates that the Help1.dbf database table corresponds to the Help1.jsp HTML file, and entry 710B indicates that the Go.dbf database table corresponds to the Go.asp HTML file. The cross-reference list 127 thus provides a way to locate a database table that corresponds to a specified HTML file, as well as a way to locate an HTML file that corresponds to a specified database table.

Figure 8:
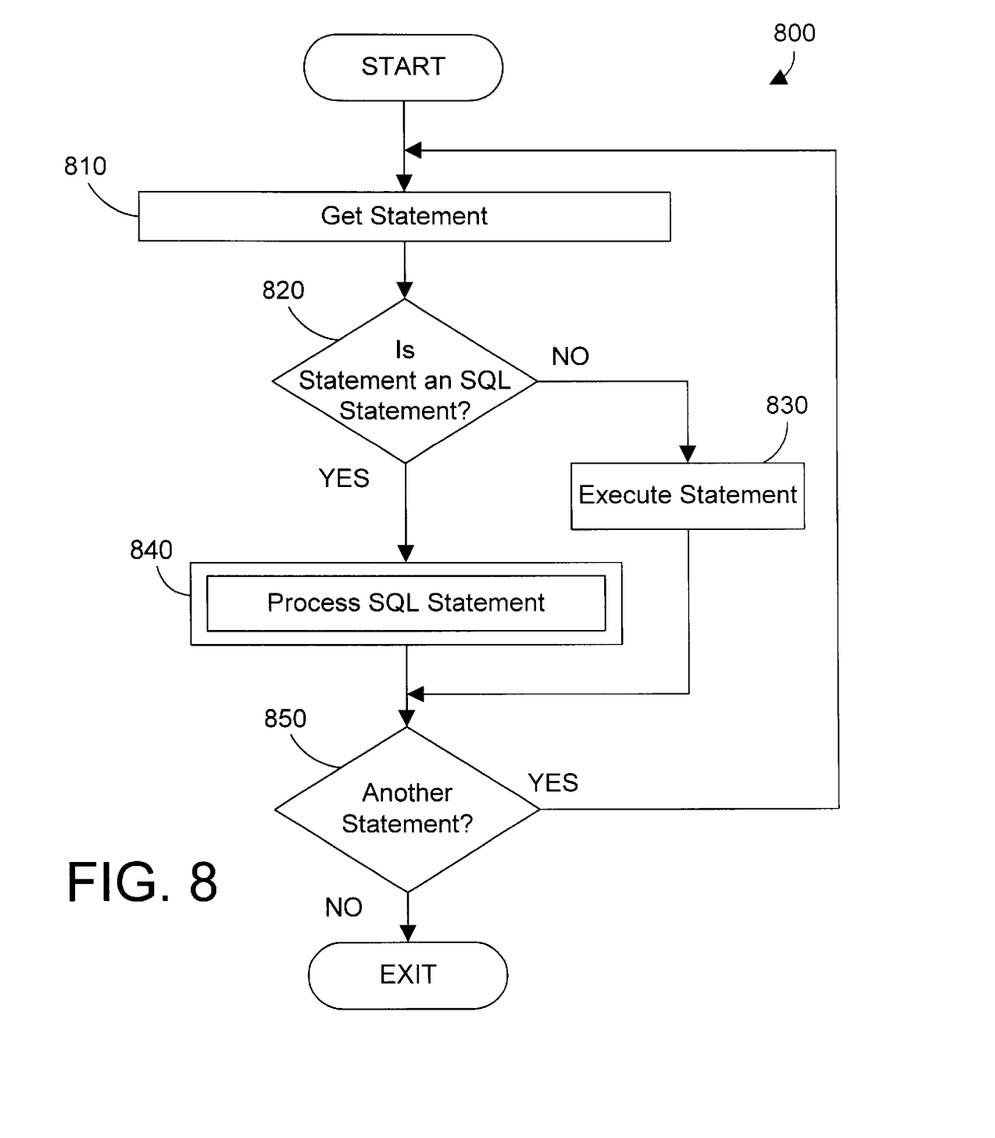
FIG. 8 is a flow diagram of a method for executing statements in accordance with the preferred embodiments.

The SQL statement processor 124 of FIG. 1 preferably performs the steps in method 800 shown in FIG. 8. First, a statement is retrieved (step 810). If the statement is not an SQL statement (step 820=NO), the statement is an instruction that is executed (step 830). If, however, the statement is an SQL statement (step 820=YES), the SQL statement is processed (step 840). If there is another statement to process (step 850=YES), method 800 loops back to step 810 and repeats the steps for the next statement until there are no more statements to process (step 850=NO). At this point, step 800 exits.

Figure 9:
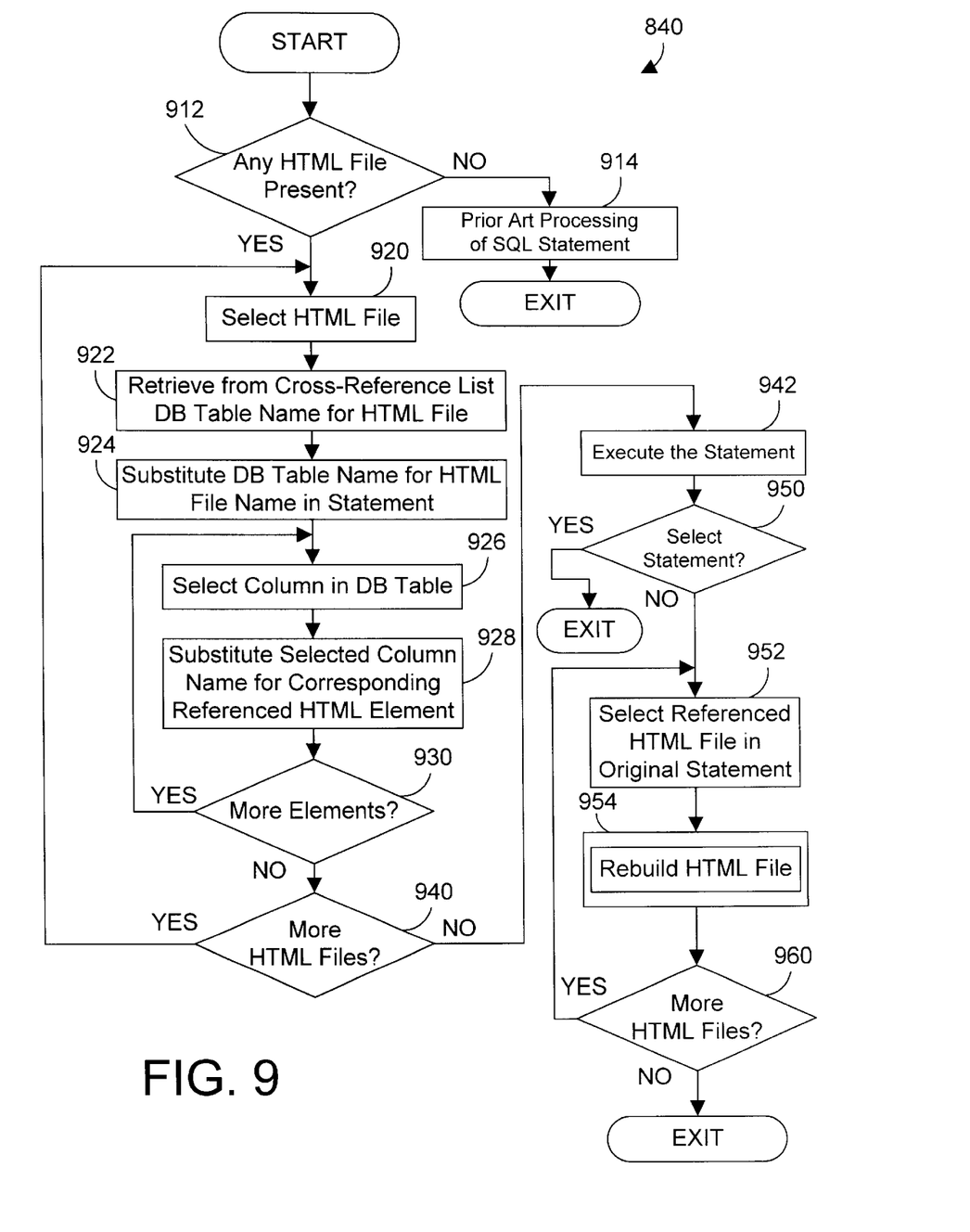
FIG. 9 is a flow diagram of a method for processing SQL statements in accordance with the preferred embodiments.

One specific implementation for step 840 in FIG. 8 is shown in FIG. 9. First, the SQL statement processor determines whether there is any HTML file present in the SQL statement (step 912). If not (step 912=NO), the SQL statement is processed according to prior art techniques (step 914), and step 840 exits. If an HTML file is specified in the SQL query (step 912=YES), the HTML file is selected (step 920), and this HTML file name is used as a key in the cross-reference list to identify the corresponding database table (step 922). The database table name is then substituted for the HTML file name in the SQL query (step 924). A column in the database table is then selected (step 926), and if there is a reference to the HTML element that corresponds to that column in the SQL query, the selected column name is substituted for the corresponding HTML element name in the SQL query (step 928). The result of performing steps 926 and 928 is that references to HTML files and elements in the query are replaced with references to the corresponding database table and columns in the table, resulting in a query that specifies a database table and columns, rather than specifying the HTML file and HTML elements. The result is a query that can be processed using prior art techniques. Steps 926 and 928 are repeated for each element in an HTML file (step 930), and for each HTML file (step 940) until there are no more HTML files to process (step 940=NO). At this point, the SQL statement (or query) is executed (step 942), preferably using prior art techniques for processing an SQL query that specifies a database table and columns within the table. If the statement is a "select" statement, this means that the access to the HTML file is a read, so this value is read from the corresponding database table and returned. Note, however, that changing the value of any column in a database table requires that the HTML file be updated to reflect the change to the database table. If the statement is not a select statement (step 950=NO), the HTML file that was referenced in the original statement is selected (step 952), and the HTML file is rebuilt (step 954). Steps 952 and 954 are repeated for each HTML file (step 960) until all HTML files that were affected by the SQL statement are updated (step 960=NO); At this point, step 840 exits.

Figure 10:
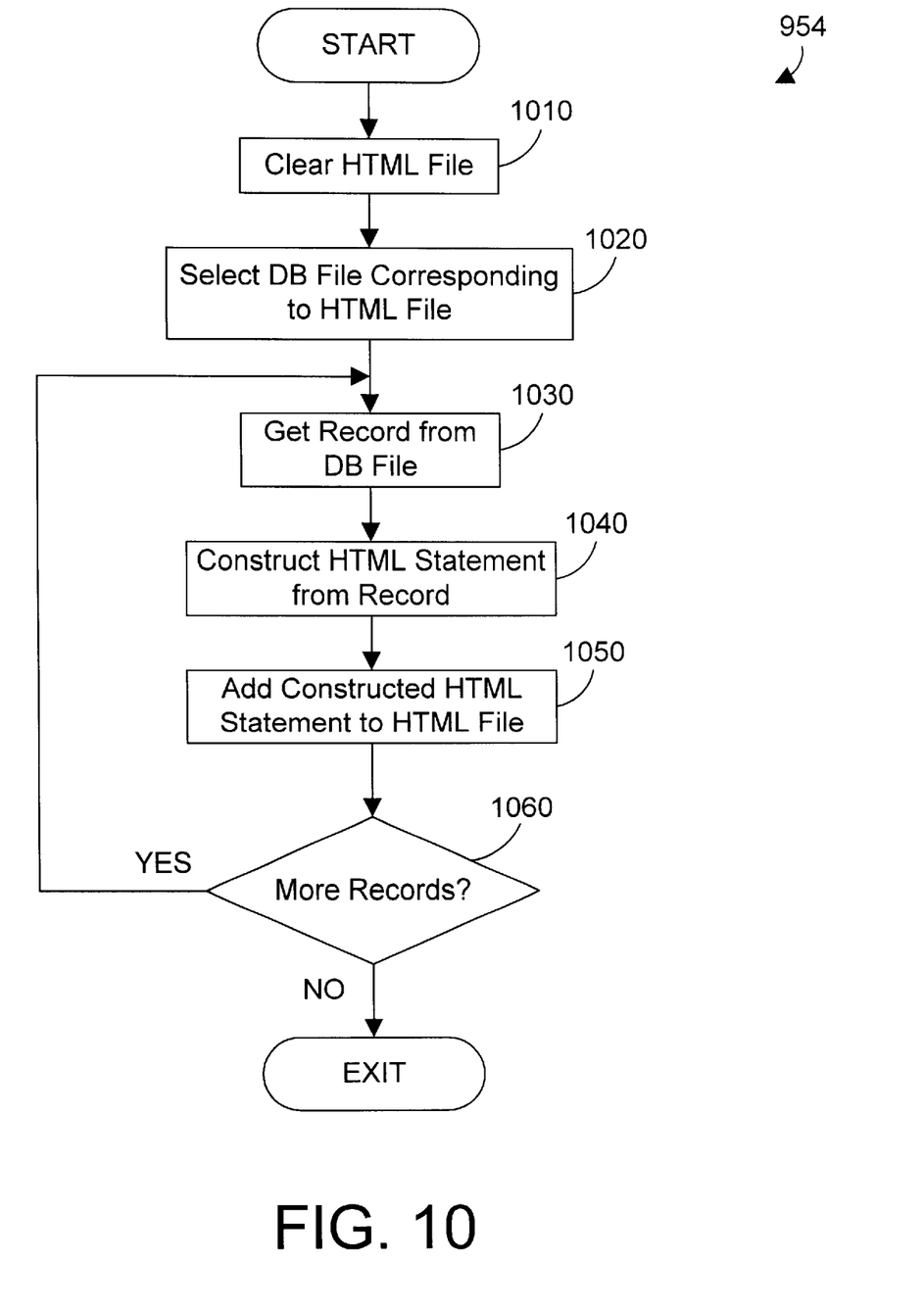
FIG. 10 is a flow diagram of a method for rebuilding an HTML file in accordance with the preferred embodiments.

Referring now to FIG. 10, one suitable implementation of step 954 in FIG. 9 is shown. This step is preferably performed by DB to HTML converter 132 within the HTML/DB translation mechanism 128. Note that step 954 in FIG. 9 could process the HTML file, locate the data in the database table that changed, and update the HTML file with the new data. A different approach is shown in FIG. 10, which rebuilds an HTML file whenever any of the columns in its associated database table are updated. First, the HTML file is cleared (step 1010). This can be done by clearing the contents of the existing file, or by deleting the existing file entirely and creating a new file of the same name. Next, the database table that corresponds to the HTML file is selected (step 1020). A record is then retrieved from the database file (step 1030), and an HTML statement is constructed from the record (step 1040). This newly-constructed statement is then added to the HTML file (step 1050). Steps 1030–1050 are repeated for each record in the database table (step 1060) until no more records are left to process (step 1060=NO), at which point step 954 exits. By rebuilding the HTML file each time a change to the corresponding database table is made, the HTML file is kept current as the database table changes due to the processing of SQL statements.

Figure 11:
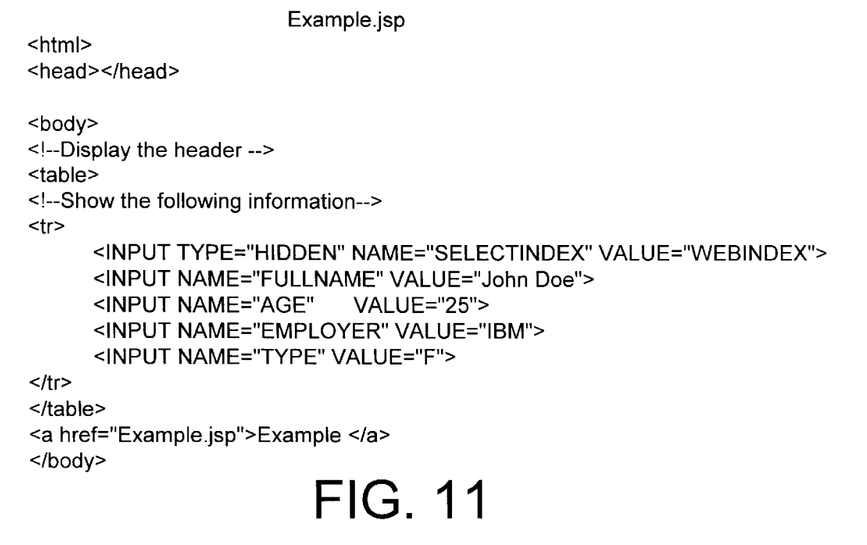
FIG. 11 is a diagram of a sample HTML file.
Figure 12:
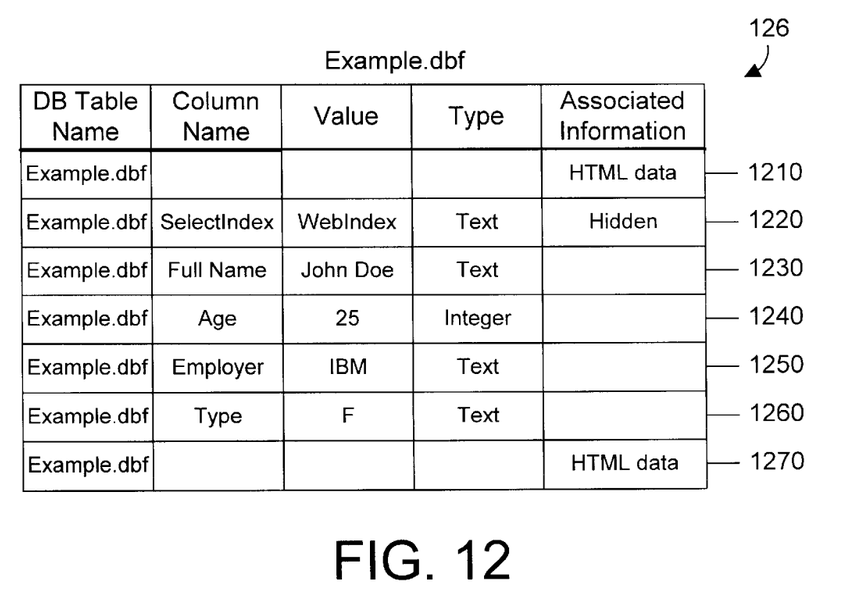
FIG. 12 is a diagram of a sample database table constructed from the HTML file of FIG. 11.

A specific example will now be presented to illustrate the apparatus and methods in accordance with the preferred embodiments. Referring to FIG. 11, a sample HTML file is shown. This specific HTML file is a JSP file called Example.jsp. This file specifies the following HTML elements: SELECTINDEX, FULLNAME, AGE, EMPLOYER, and TYPE. Each of these HTML elements have a corresponding value. We now assume that the HTML to DB converter 131 within the HTML/DB translation mechanism 128 now operates on the Example.jsp file of FIG. 11 according to the steps of method 500 shown in FIG. 5. A database table 126 is created with columns that correspond to the HTML elements in the specified HTML file. The resulting table Example.dbf is shown in FIG. 12, with the COLUMN NAME column having entries that are the same names as the HTML elements in the corresponding HTML file of FIG. 11. Note that these elements have the same values as their corresponding HTML elements in the HTML file of FIG. 11. Their type is also indicated (text or integer, for this example), and associated information is also included. Database table 126 shown in FIG. 12 includes records 1210, 1220, 1230, 1240, 1250, 1260 and 1270. Note that there are blank columns at records 1210 and 1270 that only have associated information. This associated information at record 1210 is the portion of the HTML file in FIG. 11 that precedes the first HTML element that appears as a column in the table. The associated information at record 1270 is the portion of the HTML file in FIG. 11 that follows the last HTML element that appears as a column in the table. This associated information is necessary to allow the reconstruction of an HTML file from the database table. Note that other blank entries with associated information could also be placed in the database table between the records that correspond to the HTML elements if such information is contained in the HTML file.

Figure 13:
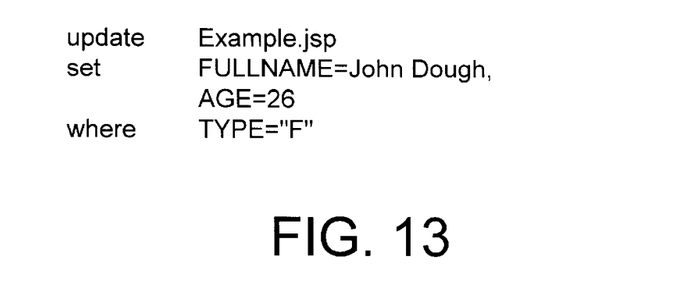
FIG 13 is a diagram of a sample SQL statement that specifies an HTML file.
Figure 14:
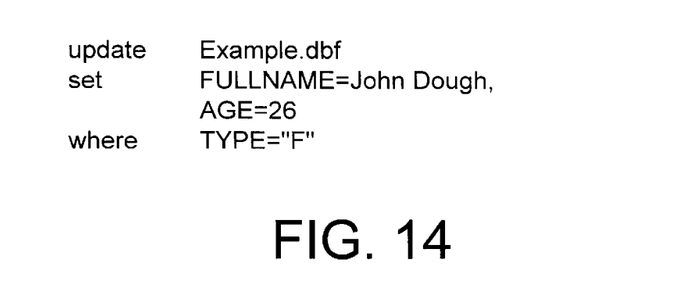
FIG. 14 is a diagram of the sample SQL statement of FIG. 14 with the name of the database table that corresponds to the HTML file specified in the query of FIG. 13 substituted into the query.
Figure 15:
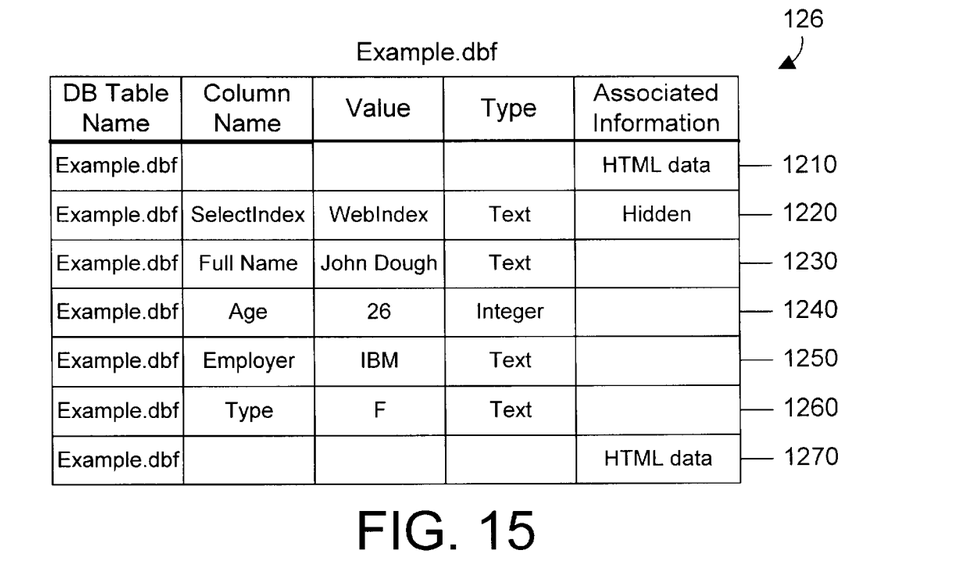
FIG. 15 is a diagram of the database table of FIG. 12 after performing the SQL query of FIG. 14.

A sample SQL "update" statement is shown in FIG. 13. We assume for this example that an employee's name and age information needs to be updated. For this specific example, we assume that John Doe's last name was originally misspelled Doe rather than its correct spelling Dough, and that John Dough's age needs to be updated from 25 to 26. The SQL "update" statement of FIG. 13 specifies that the FULLNAME and AGE HTML elements in the HTML file Example.jsp be updated. In response, the SQL statement processor substitutes the corresponding database table name, Example.dbf, for the Example.jsp HTML file name in the original statement in FIG. 13. At the same time, the HTML element names in FIG. 13 are replaced by the corresponding database column names in FIG. 14. Note for this specific example that the names of the HTML elements and corresponding database columns are identical (namely, FULLNAME, AGE and TYPE). Once the SQL query has been processed to substitute the database table name and column names for the HTML file name and HTML elements, the query can now be processed using prior art techniques. For the SQL query of FIG. 14 and the Example.dbf database table of FIG. 12, the results are shown in the database table Example.dbf of FIG. 15. Note that the spelling of John Doe has been updated to John Dough, and that the age has been updated from 25 to 26.

Figure 16:
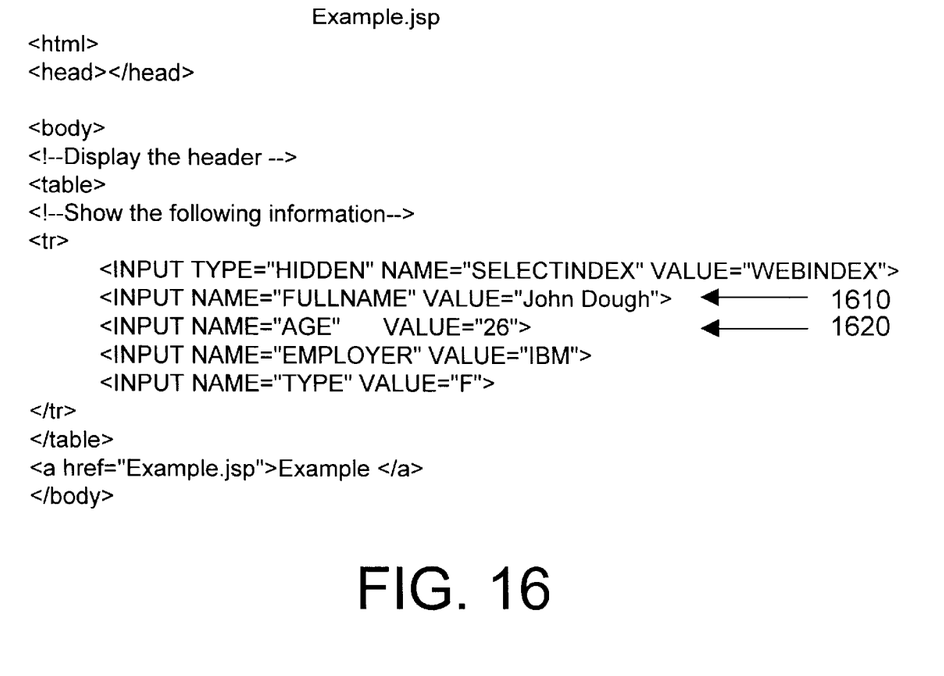
FIG. 16 is a diagram of the HTML file of FIG. 11 after processing the SQL query of FIG. 14 and rebuilding the HTML file to reflect the update to the database table in FIG. 15.

Because the database table has been updated, the new information must now be reflected in the corresponding HTML file. This updating is done by the DB to HTML converter 132 of FIG. 1 performing the steps shown in FIG. 10, resulting in the updated Example.jsp file shown in FIG. 16. Note that this file has the FULLNAME value as "John Dough" at 1610, and the age value as "26" at 1620. The Example.jsp file has thus been updated to reflect the changes to the Example.dbf table in FIG. 15.

The present invention described above with reference to the preferred embodiments provides an apparatus and method for accessing data in HTML files using an SQL query. By building support for accessing data in HTML files into SQL, all of the powerful tools already defined for SQL may be used to retrieve and manipulate data within HTML files. In addition, building support for accessing data in HTML files into SQL results in a powerful way to access HTML files in a platform-independent manner.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

We claim:

1. An apparatus comprising:

at least one processor;

a memory coupled to the at least one processor;

a translation mechanism residing in the memory and executed by the at least one processor, the translation mechanism converting at least one Hypertext Markup Language (HTML) file to a corresponding database table and building a cross-reference between each HTML file and the corresponding database table, wherein the HTML file comprises at least one HTML element, and wherein the corresponding database table comprises a record corresponding to each HTML element;

a processing mechanism residing in the memory and executed by the at least one processor, the processing mechanism processing a structured quay language (SQL) query that specifies at least one HTML file and at least one HTML element in the HTML file, wherein the processing mechanism substitutes in the SQL query a name for a corresponding database table for the HTML file and a name for a corresponding record for each HTML element in the SQL query, wherein the processing mechanism uses the cross-reference to access data in a database table that corresponds to the specified HTML file in processing the SQL query.

2. The apparatus of claim 1 wherein the processing mechanism comprises an SQL engine.

3. The apparatus of claim 1 wherein the translation mechanism includes a mechanism for generating an HTML file from a corresponding database table.

4. The apparatus of claim 3 wherein the translation mechanism automatically updates an existing HTML file when the corresponding database table is updated.

5. The apparatus of claim 3 wherein the translation mechanism automatically generates an HTML file when the corresponding database table is updated.

6. An apparatus comprising:

(1) at least one processor;

(2) a memory coupled to the at least one processor;

(3) at least one Hypertext Markup Language (HTML) file residing in the memory, each HTML file comprising at least one HTML element;

(4) a translation mechanism residing in the memory and executed by the at least one processor, the translation mechanism comprising:

(4A) a mechanism that converts at least one HTML file to a corresponding database table, wherein each HTML element in the HTML file has a corresponding record in the corresponding database table;

(4B) a mechanism that generates a cross-reference between the HTML file and the corresponding database table; and (4C) a mechanism for generating an HTML file from a corresponding database table;

(5) a processing mechanism residing in the memory and executed by the at least one processor, the processing mechanism comprising:

(5A) a mechanism that processes a structured query language (SQL) query that specifies at least one HTML file and at least one HTML element in the at least one HTML file;

(5B) a mechanism that modifies the SQL query by substituting references to each HTML file with a reference to the corresponding database table, and by substituting references to each HTML element in the SQL query with references to the corresponding records in the database table; and (5C) a mechanism that processes the modified SQL query and that automatically generates an HTML file when the corresponding database table is updated by processing the SQL query.

7. A method for processing a structured query language (SQL) query that specifies at least one Hypertext Markup Language (HTML) file and at least one element in the at least one HTML file, the method comprising the steps of:

generating a database table that corresponds to each HTML file, the database table comprising a record that corresponds to each HTML element in the HTML file;

generating a cross-reference between the HTML file and the corresponding database table;

modifying the SQL query by substituting the corresponding database table for the HTML file in the SQL query;

modifying the SQL query by substituting the corresponding record for each HTML element in the SQL query; and processing the modified SQL query with an SQL engine using the cross-reference to access data in a database table that corresponds to the specified HTML file.

8. The method of claim 7 further comprising the step of generating an HTML file from a corresponding database table.

9. The method of claim 7 further comprising the step of automatically updating an existing HTML file when the corresponding database table is updated by processing the modified SQL query.

10. The method of claim 7 further comprising the step of automatically generating an HTML file when the corresponding database table is updated by processing the modified SQL query.

11. The method of claim 7 wherein the steps of modifying the SQL query use the cross-reference to determine which database table corresponds to a selected HTML file.

12. A method for accessing at least one Hypertext Markup Language (HTML) element in at least one HTML file, the method comprising the steps of:

generating a database table that corresponds to each HTML file, the database table comprising a record that corresponds to each HTML element in the HTML file;

generating a cross-reference between the HTML file and the corresponding database table;

modifying a query that specifies the HTML file and at least one HTML element in the HTML file by substituting the corresponding database table for the HTML file in the query;

modifying the query by substituting the corresponding record for each HTML element in the query;

processing the modified query; and if the modified query updates a database table, generating an HTML file corresponding to the updated database table.

13. A computer-readable program product comprising:

(1) a structured query language (SQL) engine comprising:
(1A) a translation mechanism that converts at least one Hypertext Markup Language (HTML) file to a corresponding database table and builds a cross-reference between each HTML file and the corresponding database table, wherein the HTML file comprises at least one HTML element, and wherein the corresponding database table comprises a record corresponding to each HTML element;

(1B) a processing mechanism that processes an SQL query that specifies at least one HTML file and at least one HTML element in the HTML file, wherein the processing mechanism substitutes in the SQL query a name for a corresponding database table for the HTML file and a name for a corresponding record for each HTML element in the SQL query, wherein the processing mechanism uses the cross-reference to access data in a database table that corresponds to the specified HTML file in response to processing the SQL query; and (2) signal bearing media bearing the SQL engine.

14. The program product of claim 13 wherein the signal bearing media comprises recordable media.

15. The program product of claim 13 wherein the signal bearing media comprises transmission media.

16. The program product of claim 13 wherein the translation mechanism includes a mechanism for generating an HTML file from a corresponding database table.

17. The program product of claim 16 wherein the translation mechanism automatically updates an existing HTML file when the corresponding database table is updated.

18. The program product of claim 16 wherein the translation mechanism automatically generates an HTML file when the corresponding database table is updated.

19. A computer-readable program product comprising:

(1) a structured query language (SQL) engine comprising:
(1A) a translation mechanism comprising:
(1A1) a mechanism that converts at least one HTML file to a corresponding database table, wherein each HTML element in the HTML file has a corresponding record in the corresponding database table;

(1A2) a mechanism that generates a cross-reference between the HTML file and the corresponding database table; and (1A3) a mechanism for generating an HTML file from a corresponding database table;

(1B) a processing mechanism comprising:
(1B1) a mechanism that processes an SQL quay that specifies at least one HTML file and at least one HTML element in the at least one HTML file;

(1B2) a mechanism that modifies the SQL query by substituting references to each HTML file with a reference to the corresponding database table, and by substituting references to each HTML element in the SQL query with references to the corresponding records in the database table; and (1B3) a mechanism that processes the modified SQL query and that automatically generates an HTML file when the corresponding database table is updated by the SQL query; and (2) signal bearing media bearing the SQL engine.

20. The program product of claim 19 wherein the signal bearing media comprises recordable media.

21. The program product of claim 19 wherein the signal bearing media comprises transmission media.

* * * * *

UNITED STATES PATENT AND TRADEMARK OFFICE
CERTIFICATE OF CORRECTION

PATENT NO.     : 6,778,983 B1  
DATED          : August 17, 2004  
INVENTOR(S)    : Cary Lee Bates, Paul Reuben Day and John Matthew Santosuosso It is certified that error appears in the above-identified patent and that said Letters Patent is hereby corrected as shown below:

Column 10,  
Line 17, "quay" should be -- query --.

Column 12,  
Line 44, "quay" should be -- query --.

Signed and Sealed this

Fourth Day of January, 2005

JON W. DUDAS  
*Director of the United States Patent and Trademark Office*